United States Patent [19]

Kawakami et al.

[11] Patent Number: 4,660,102

[45] Date of Patent: Apr. 21, 1987

[54] ELECTRONIC STILL CAMERA CAPABLE OF EDITING PICTURE RECORDED ON DISK

[75] Inventors: Chikuni Kawakami; Katsuo Nakadai, both of Kaisei, Japan

[73] Assignee: Fuji Photo Film Co., Ltd., Kanagawa, Japan

[21] Appl. No.: 681,583

[22] Filed: Dec. 14, 1984

[30] Foreign Application Priority Data

Dec. 22, 1983 [JP] Japan ................... 58-241068

[51] Int. Cl.$^4$ ........................................ H04N 5/781
[52] U.S. Cl. ...................... 360/14.1; 358/906; 358/335; 358/909; 360/35.1; 360/33.1
[58] Field of Search ............ 358/906, 335, 909; 360/35.1, 14.1, 15, 10.1, 33.1, 73

[56] References Cited

U.S. PATENT DOCUMENTS

| | | | |
|---|---|---|---|
| 3,721,757 | 3/1973 | Ettlinger | 360/14.3 |
| 3,893,169 | 7/1975 | Hall | 360/73 |
| 4,366,501 | 12/1982 | Tsunekawa | 358/906 |

FOREIGN PATENT DOCUMENTS

| | | | |
|---|---|---|---|
| 3325908 | 2/1984 | Fed. Rep. of Germany | 360/10.1 |
| 99516 | 6/1979 | Japan | 360/10.1 |
| 48773 | 5/1981 | Japan | 360/10.1 |

Primary Examiner—Alan Faber
Attorney, Agent, or Firm—Birch, Stewart, Stewart & Birch

[57] ABSTRACT

An electronic camera for shooting an object to store a still picture of the object in a first rotary magnetic recording medium in the form of video signals includes a driving device for turning the first rotary magnetic recording medium which is detachably mounted, and a recording device for recording video signals of a unit of still picture on the first rotary magnetic recording medium while rotating. The electronic still camera further includes a first terminal for receiving video signals of still picture read out from a second rotary magnetic recording medium, a second terminal for receiving a control signal in response to a reading operation of the video signals from the second rotary magnetic recording medium, and a control device for controlling the driving device and the recording device. The control device causes the first rotary magnetic recording medium to be turned in response to the control signal received on the second terminal so as to record a unit of video signals of still picture received on the first terminal on the first magnetic recording medium in response to the control signal.

9 Claims, 1 Drawing Figure

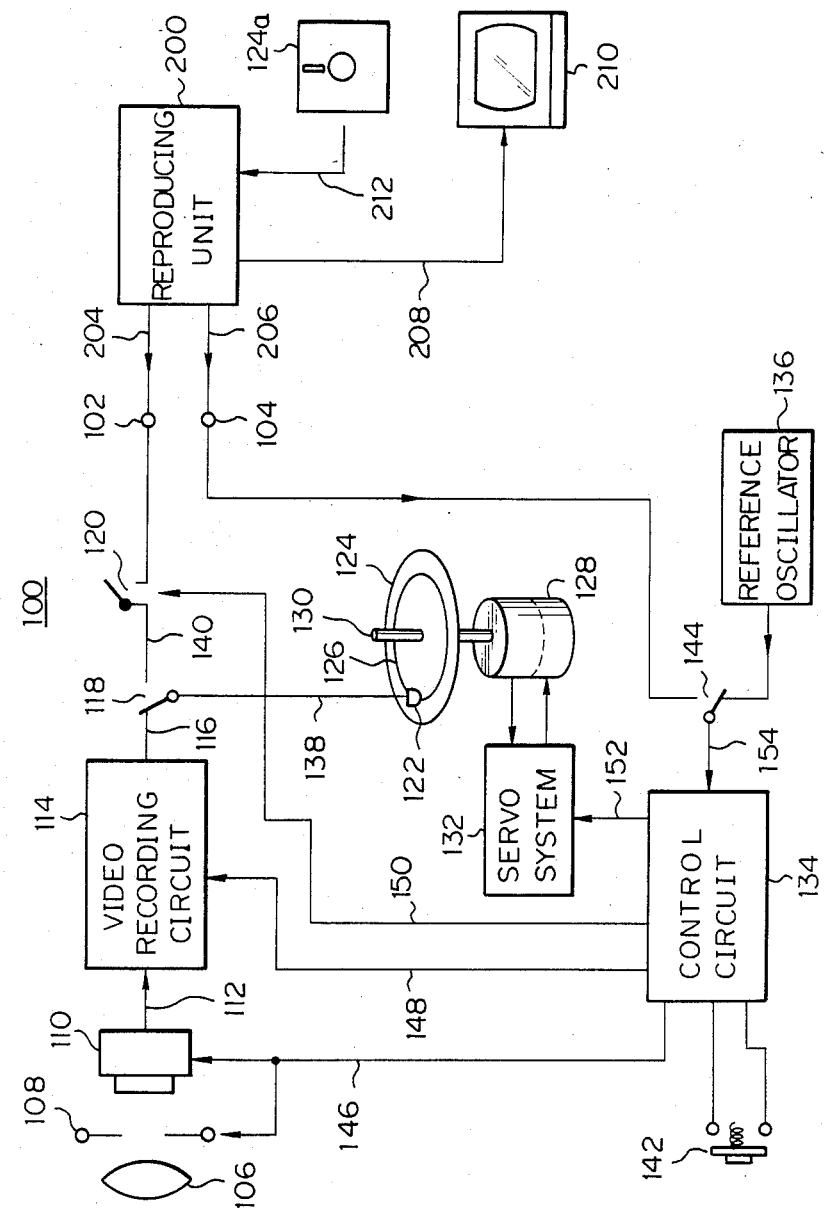

ELECTRONIC STILL CAMERA CAPABLE OF EDITING PICTURE RECORDED ON DISK

BACKGROUND OF THE INVENTION

1. Field of the Invention

The present invention relates to an electronic still camera, and in particular, to an electronic still camera having a function of editing a picture frame of a still picture magnetically recorded on a rotating magnetic recording medium such as a magnetic disk by an electronic still camera.

2. Description of the Prior Art

An electronic camera system has been recently developed which includes an image pickup device, such as a solid-state image pickup device and a camera tube, combined with a recording device in the form of a rotating magnetic recording medium, such as a lowpriced magnetic disk with a large storage capacity. According to this system, objects are electronically sensed in the form of still pictures, which are in turn recorded on the rotating magnetic recording medium. Such recorded still pictures are reproduced by a separate reproducing system such as a television system or printer.

In an electronic camera system, picture frames are generally recorded in sequence on tracks of a disk. Consequently, the disk may also contain faulty and/or unnecessary frames, which will not be a great problem, in a system which has random access to any desired track or which can erase recorded signals on a track-by-track basis, at the cost of the longer access time and the inefficiency in terms of the disk storage capacity.

Among the systems of the type which do not have a random access function or which includes a very thin and small disk recordable with a high recording density, however, there are some systems which cannot perform the track-by-track basis erasing. When it is desired to reproduce the pictures recorded on a disk in such a system, the recorded pictures including the faulty frames resultant from an erroneous picture shooting condition and the unnecessary frames may be reproduced and displayed on a screen of a monitor device.

To avoid the above-mentioned difficulties, an editing system is required to record only desired picture frames on a magnetic disk for storage. For an effective usage of the full disk storage capacity, it is also preferable to employ an editing system. Since an electronic camera system has been generally developed for family use, and not for the professional application, such an editing system should be preferably configured to be as simple as possible and should be economically used.

SUMMARY OF THE INVENTION

It is therefore an object of the present invention to provide an electronic still camera in a simple configuration having a function to edit picture frames recorded on a magnetic disk.

In accordance with the present invention, there is provided an electronic still camera for shooting an object to store a still picture of the object in a first rotary magnetic recording medium in the form of video signals, comprising:

driving means for turning said first rotary magnetic recording medium, which is detachably mounted; and recording means for recording video signals of a unit of still picture on said first rotary magnetic recording medium while rotating;

said electronic still camera further comprising:

first terminal means for receiving video signals of still picture read out from a second rotary magnetic recording medium;

second terminal means for receiving a control signal in response to the video signal from said second rotary magnetic recording medium; and control means for controlling said driving means and said recording means;

said control means causing said first rotary magnetic recording means to be turned in response to the control signal received on said second terminal means, and recording a unit of video signals of still picture received on said first terminal means on said first magnetic recording medium in response to the control signal.

BRIEF DESCRIPTION OF THE DRAWING

The objects and features of the present invention will become more apparent from the consideration of the following detailed description taken in conjunction with the accompanying drawing in which:

The FIGURE is a schematic block diagram showing an embodiment of an electronic still camera in accordance with the present invention.

DESCRIPTION OF THE PREFERRED EMBODIMENT

Referring to the schematic block diagram representing an electronic still camera, the embodiment of the present invention basically comprises a camera 100 and a reproducing unit 200. The camera 100 is an electronic still camera which is constructed so as to be electrically connected to the reproducing unit 200 through terminals 102 and 104.

The camera 100 may advantageously be separated from the reproducing unit 200 to be utilized in the form of a single camera unit. The camera 100 comprises components required to shoot an object, such as a lens 106, an optical shutter 108, and solid-state image pickup device (or a camera tube) 110.

The solid-state image pickup device 110 has a video output 112 connected to a video signal recording circuit 114. In the video signal recording circuit 114, a frequency modulation is conducted on video signals delivered from the image pickup device 110 in accordance with a raster scanning fashion to produce the resultant signals as modulated video signals. Video recording circuit 114 has a modulated video signal output 116 connected via a changeover switch 118 and a line 138 to a magnetic recording head 122 for transferring the modulated video signals thereto. The switch 118 has another terminal 140 connected to the modulated video signal input terminal 102 through a switch 120.

The magnetic head 122, which is carried by a head transport mechanism, not shown, and is movable to a desired track position, for example, track 126 of a disk, comprises an electromagnetic transducer for recording a video signal on the selected track 126. The magnetic disk 124 is detachably mounted on a rotating shaft 130 to be driven by a motor 128, and is rotated at a stationary speed in a predetermined direction by the motor 128 and its servo system 132.

The operation of the overall camera system 100 is controlled by a control circuit 134. The control circuit 134 has a reference signal input 154 to which a sync signal is supplied selectively via a changeover switch 144 from a reference oscillator 136, or externally on the terminal 104. The control circuit 134 controls the shutter 108, the image pickup device 110, the video signal recording circuit 114, the switch 120, the servo system 132, etc. in synchrony with the sync signal as indicated with control lines with the arrow 146, 148, 150, and 152, so that a unit of, for instance, a field of still picture video signals are recorded on the track 126 in response to the operation of a shutter release button 142.

The switches 118 and 144, which may be manual switches which operate cooperatively with each other, are set as depicted in the block diagram when the camera 100 is used as an independent unit and, are set to states opposite to those shown in this FIGURE when the camera 100 is used as an editing device connected to a reproducing apparatus 200 as will be described later. If a pair of disconnectable connector units are employed to connect output lines 204 and 206 of the reproducing unit 200 to the terminals 102 and 104, respectively, the system will be advantageously configured so that the switches 118 and 144 are set to the states opposite to those shown in this block diagram when the connector units are mechanically enagaged with each other. The amount of the modulated video signals recorded on one track 126 is equivalent to a unit of, for instance, a field of picture obtained by the image pickup device 110 when the switch 118 is at the position illustrated in this FIGURE. When the release button 142 is actuated, a field of video signals are developed from the image pickup device 110 to undergo a frequency modulation in the video recording circuit 114 so as to be recorded on the track 126. The control circuit 134 controls these elements in synchronism with the sync signal generated by the reference oscillator 136 in order to perform the recording operation.

With the switch 118 set to the contact position opposite to that shown in the FIGURE, the switch 120 is closed when the release button is actuated. In this case, a modulated video signal externally supplied to the modulated video signal input terminal 102 is recorded on the track 126. The control circuit 134 controls these elements in synchrony with the sync signal supplied to the sync signal input terminal 104 in order to conduct the recording operation.

The reproducing unit 200 has the modulated video signal output 204 for connection to the modulated video signal input 102 of the camera 100, the sync signal output 206 for connection to the sync signal input 104 thereof, and a video signal output terminal 208 for connection to a video monitor unit 210 when required.

When a magnetic disk 124a on which video signals are recorded by use of an electronic still camera, such as the camera 100, is loaded into the reproducing unit 200, video signals are ordinarily read out from the magnetic disk 124, as conceptually indicated by the arrow line 212, and are reproduced in the form of visible images on the monitor unit 210. The reproducing unit 200 comprises an operator's panel section for selecting a desired track on the magnetic disk 124a to reproduce visual images from signals obtained from the selected track, and a control section for controlling the tracking of the magnetic reproducing head involved, the driving in rotation of the magnetic disk 124a, and the like operations. A modulated video signal obtained through the frequency modulation is read out from the disk 124a to be transferred to a signal line 212, and is in turn demodulated by the reproducing unit 200, for example, into a video signal in conformity with the NTSC format. The resultant signal is delivered from the output 208 to the monitor unit 210.

The reproducing unit 200 also amplifies the video signal read out from the magnetic disk 124a and delivers the amplified signal to the modulated video signal output 204 without demodulation. It separates a sync signal involved in the signals read out from the magnetic disk 124a to develop the separated sync signal from the sync signal output 206. Although the sync signal may be extracted from video signals, the vertical synchronization of a picture can be advantageously established by detecting a synchronization mark formed, for example, on a core of the magnetic disk 124a.

To utilize the camera 100 as an editing system, the terminals 102 and 104 are connected to the reproducing unit 200, and the switches 118 and 144 are each set to the states opposite to those depicted in this FIGURE. Next, a magnetic disk 124a on which original pictures to be edited are recorded is loaded into the reproducing unit 200. Such original pictures should be preferably monitored with the monitor unit 210.

Another magnetic disk 124 is loaded in the camera 100, and the magnetic recording head 122 is moved to an unrecorded track, for example, track 126 on which no signals have been recorded.

A desired frame of an image may be displayed on the monitor unit 210 by operating the operator's panel section of the reproducing unit 200, which causes the video and sync signals associated with this image to be delivered to the terminals 204 and 206.

If the shutter release button 142 of the camera 100 is actuated at this moment, the control circuit 134 controls the motor 128 via the servo system 132 in response to the operation of the shutter release button 142 so as to rotate the magnetic disk 124 at a stationary speed synchronized with the sync signal fed to the terminal 104 from the sync signal output 206 of the reproducing unit 200. The control circuit 134 closes the switch 120 in response to the sync signal received on the terminal 104, and keeps the switch 120 closed for a time period equivalent to that of a field of video signals so that the video signals delivered from the video signal output 204 of the reproducing unit 200 are fed to the magnetic recording head 122. A field of video signals read out from the magnetic disk 124a are thus recorded on the track 126 of the magnetic disk 124. In order to clearly notify the recording operation to the operator, a tone generating device such as a piezo-electric device may be arranged so that a pseudo-shutter sound is produced when the recording operation on the magnetic disk 124 is initiated.

In accordance with the present invention, accordingly, only the video signals of the desired frame can be selected from the signals recorded on the magnetic disk 124a so that the selected video signals can be re-recorded on the magnetic disk 124.

Although the video signals delivered from the modulated video signal output 204 of the reproducing unit 200 have undergone the frequency modulation in the embodiment, this signal scheme need not be necessarily adopted. For example, a digital video signal system using the luminance and chroma signals or a line sequential signal system in which signals are alternately processed for each scanning line is also applicable.

In the embodiment described above, a high-quality picture can be reproduced because the frequency modulation is conducted on the video signals. Moreover, the functions of an ordinary camera dedicated to taking pictures are fully utilized for the camera 100 with the switches 118, 144, and 120, the signal terminals 102 and 104, and several associated circuits added in circuit structure.

While re-recording video signals, character data as well as image data from another processing unit may be combined therewith to be recorded on a disk.

As described above, the desired frames of pictures recorded on a magnetic disk can be re-recorded on another disk in accordance with the present invention. This re-recording operation can be implemented by use of the electronic camera's recording function which is not ordinarily used when a reproducing unit is employed, where only video and sync signals are supplied from an apparatus for reproducing video signals recorded on a magnetic disk. Consequently, pictures recorded on a magnetic disk can be edited by using an electronic still camera having an editing function accomplished with a simple structure.

While the present invention has been described with reference to the particular illustrative embodiment, it is not to be restrictive by the embodiment, but only by the appended claims. It is to be appreciated that those skilled in the art can change or modify the embodiment without departing from the scope and spirit of the present invention.

What is claimed is:

1. An electronic still camera comprising:
   imaging means for imaging an object to produce a unit of video signals representative of the object;
   driving means for turning a first rotary magnetic recording medium which is detachably mounted thereon;
   recording means for recording a unit of video signals on said first rotary magnetic recording medium while rotating;
   a shutter release button for initiating the imaging of an object;
   oscillator means for generating a first sync signal from said shutter release button;
   control means, operative in response to operation of said shutter release button and the first sync signal, for controlling said imaging, driving and recording means so as to shoot an object and store a still picture of the object in said first rotary magnetic recording medium in the form of video signals;
   first terminal means for receiving video signals representative of a still picture read out from a second rotary magnetic recording medium;
   second terminal means for receiving a second sync signal in response to a reading operation of the video signals from said second rotary magnetic recording medium; and
   selecting means for selectively conducting the first and second sync signals from said oscillator means and second terminal means, respectively, to said control means;
   said control means also being responsive to the second sync signal received on said second terminal means and conducted by said selecting means to cause said first rotary magnetic recording medium to be turned so as to record a unit of video signals of a still picture received on said first terminal means onto said first magnetic recording medium.

2. An electronic still camera in accordance with claim 1, wherein said video and control signals received on said first and second terminal means, respectively, are supplied from a reproducing apparatus for reading out a unit of video signals of a still picture recorded on said second rotary magnetic recording medium which is detachably mounted.

3. An electronic still camera in accordance with claim 1, wherein said first and second rotary magnetic recording media include magnetic recording disks.

4. An electronic still camera in accordance with claim 1, wherein the unit of video signals include a field of video signals formed in a raster scanning fashion.

5. An electronic still camera in accordance with claim 1, wherein said control means is responsive to said shutter release button to cause said first rotary magnetic recording medium to be turned thereby recording a unit of video signals of a still picture received on said first terminal means onto said first magnetic recording medium.

6. An editing system for editing pictures recorded on a magnetic recording medium comprising:
   an electronic still camera for shooting an object to thereby store first video signals representative of a still picture of the object in a first rotary magnetic recording medium; and
   reproducing means for reproducing a unit of second video signals representative of a still picture and a first sync signal recorded on a second rotary magnetic recording medium which is detachably mounted thereon; said still camera including,
   imaging means for imaging an object to produce a unit of first video signals representative of the object,
   driving means for turning said first rotary magnetic recording medium which is detachably mounted thereon,
   recording means for recording a unit of video signals on said first rotary magnetic recording medium while rotating,
   a shutter release button,
   oscillator means for generating a second sync signal,
   control means operative in response to said shutter release button and the second sync signal for controlling said imaging, driving and recording means so as to shoot an object to store a still picture of the object in said first rotary magnetic recording medium in the form of video signals,
   first input means interconnected to said reproducing means for receiving the second video signals,
   second input means interconnected to said reproducing means for receiving the first sinc signal, and
   selecting means for selectively conducting the first and second sync signals from said second input means and oscillator means, respectively, to said control means;
   said control means also being responsive to the first sync signal received on said second input means and conducted by said selecting means to cause said first rotary magnetic recording medium to be turned so as to record a unit of the second video signals of still picture received on said first input means onto said first magnetic recording medium.

7. An editing system in accordance with claim 6, wherein said first and second rotary magnetic recording media include magnetic recording disks.

8. An editing system in accordance with claim 6, wherein the unit of video signals include a field of video signals formed in a raster scanning fashion.

9. An editing system in accordance with claim 6, wherein said control means is responsive to said shutter release button to cause said first rotary magnetic recording medium to be turned thereby recording a unit of the second video signals of a still picture received on said first input means onto said first magnetic recording medium.

* * * * *